(12) United States Patent
Lu (10) Patent No.: US 7,408,592 B2
(45) Date of Patent: Aug. 5, 2008

(54) METHOD AND DEVICE FOR DYNAMICALLY ADJUSTING SYNC-ON-GREEN (SOG) SIGNAL OF VIDEO SIGNAL

(75) Inventor: Chih-Shiun Lu, Hsinchu County (TW)

(73) Assignee: MSTAR Semiconductor, Inc., Hsinchu (TW)

( * ) Notice: Subject to any disclaimer, the term of this patent is extended or adjusted under 35 U.S.C. 154(b) by 554 days.

(21) Appl. No.: 11/140,958

(22) Filed: Jun. 1, 2005

(65) Prior Publication Data

US 2005/0270421 A1    Dec. 8, 2005

(51) Int. Cl.
*H04N 5/04* (2006.01)

(52) U.S. Cl. ...................................................... 348/691

(58) Field of Classification Search ................. 348/525, 348/530, 691, 532, 534, 692, 694, 500, 524, 348/536, 540, 547
See application file for complete search history.

(56) References Cited

U.S. PATENT DOCUMENTS

| | | | | |
|---|---|---|---|---|
| 5,164,726 A * | 11/1992 | Bernstein et al. | ............ | 341/120 |
| 5,270,821 A * | 12/1993 | Samuels | ..................... | 348/552 |
| 5,400,086 A * | 3/1995 | Sano et al. | .................. | 348/678 |
| 5,805,150 A * | 9/1998 | Nishino et al. | .............. | 345/213 |
| 5,818,538 A * | 10/1998 | Kim | ........................... | 348/525 |
| 6,064,443 A * | 5/2000 | Lee | ............................ | 348/530 |
| 6,587,139 B1 * | 7/2003 | Hirao | ........................ | 348/194 |

\* cited by examiner

*Primary Examiner*—Paulos M Natnael
(74) *Attorney, Agent, or Firm*—WPAT., P.C.; Justin King (57) ABSTRACT

The present invention discloses a method and a device for dynamically adjusting a sync-on-green (SOG) signal of a video signal, capable of extracting an SOG signal from an analog video signal so as to dynamically adjust the SOG signal in real-time so as to overcome the problems due to voltage shift or noise.

23 Claims, 7 Drawing Sheets

METHOD AND DEVICE FOR DYNAMICALLY ADJUSTING SYNC-ON-GREEN (SOG) SIGNAL OF VIDEO SIGNAL

BACKGROUND OF THE INVENTION

1. Field of the Invention

The present invention generally relates to a method and a device for dynamically adjusting a sync-on-green (SOG) signal of a video signal and, more particularly, to a method and a device capable of extracting an SOG signal from a video signal so as to dynamically adjust the SOG signal.

2. Description of the Prior Art

In recent years, with the development in video transmission technologies, a demand for better image quality and higher resolution has become stronger than ever. It has therefore attracted tremendous attention to exhibit high quality video precisely on a high resolution display.

During video transmission, a video signal often suffers from sources of interference which lead to distortion, color deviation, and even image jiggling. Generally, these undesirable problems result from incapable of precisely extracting the synchronization signal from the video signal. More specifically, the synchronization signal, often referred to as a sync-on-green (SOG) signal, is carried on the green color of the three primary colors RGB. The SOG signal is a clock signal and is hidden in the analog video signal. Therefore, it is crucial to extract the SOG signal from the analog video signal and determine the timing of the SOG signal.

Figure 1:
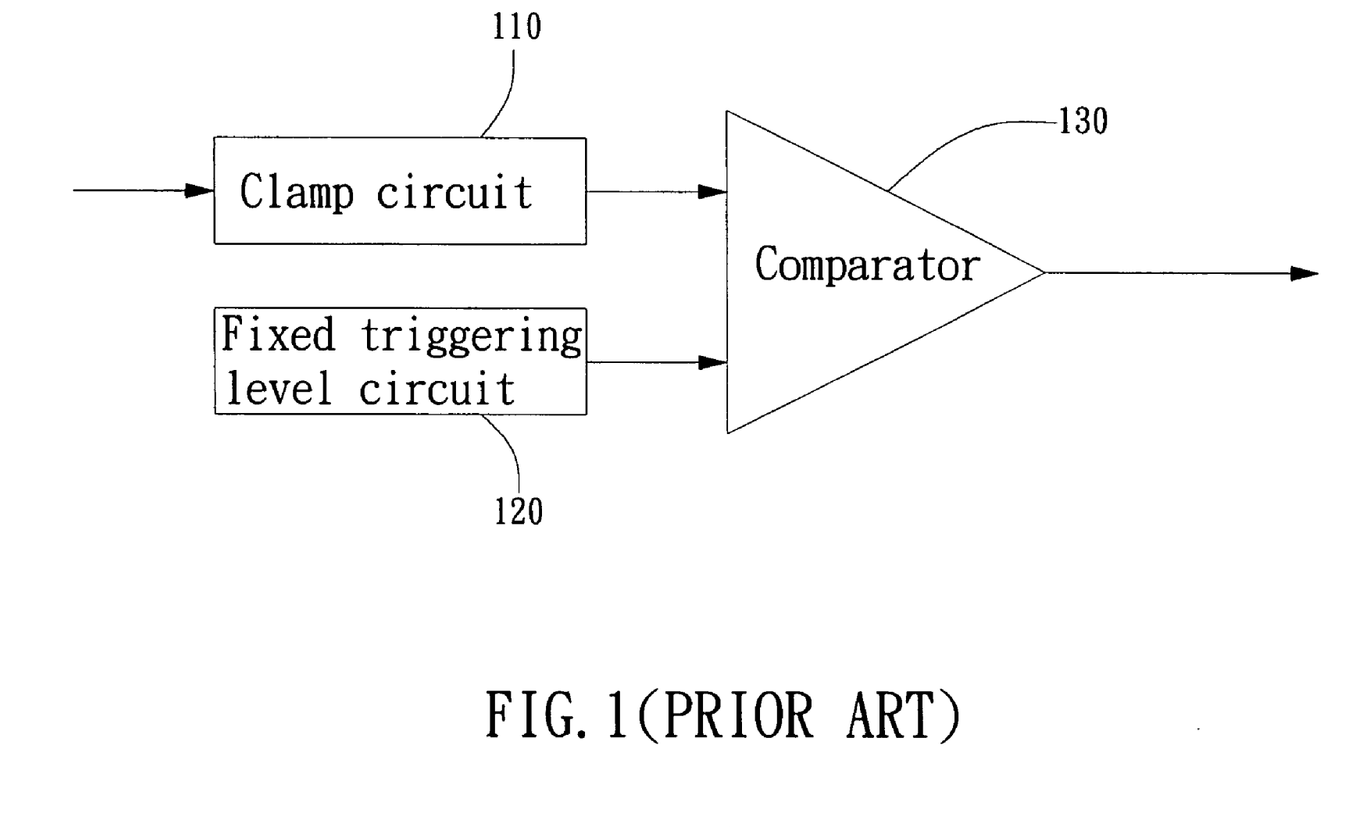
FIG. 1 is a schematic diagram showing a conventional device for adjusting an SOG signal of a video signal in the prior art.

Please refer to FIG. 1, which is a schematic diagram showing a conventional device for adjusting an SOG signal of a video signal in the prior art. In FIG. 1, a video signal is transmitted into a clamp circuit 110 so as to limit the voltage range and then is compared by a comparator 130 to a fixed clamp level defined by a fixed triggering level circuit 120. The prior art technology fails to dynamically adjust the SOG signal. Thus, the SOG signal cannot be extracted precisely when voltage shifting, noise and/or other sources of interference occur, which may cause serious problems.

Therefore, there is need in providing a method and a device for dynamically adjusting a SOG signal of a video signal, capable of extracting an SOG signal from a video signal so as to dynamically adjust the SOG signal and thus overcome the foregoing problems.

SUMMARY OF THE INVENTION

It is a primary object of the present invention to provide a method and a device for dynamically adjusting a sync-on-green (SOG) signal of a video signal, capable of extracting an SOG signal from an analog video signal so as to dynamically adjust and update the SOG signal in real-time such that problems due to voltage shift or noise can be overcome.

In order to achieve the foregoing object, the present invention provides a method for dynamically adjusting a sync-on-green (SOG) signal of a video signal, the method comprising steps of: receiving a video signal comprising an SOG signal; outputting a clamped signal according to a clamp level by limiting a voltage swing range of the video signal; determining a triggering level by using a weighting process so as to output a triggering signal according to a first sampling value and a second sampling value of the SOG signal; comparing the clamped signal and the triggering signal so as to output a compared signal; and performing a control operation according to the compared signal so as to generate a feedback control signal for dynamically adjusting the clamp level and the triggering level.

It is preferable that the weighting process comprises steps of: providing a weighting value; and performing a weighting operation according to the first sampling value and the second sampling value so as to determine the triggering level. More particularly, the weighting value is a default setting value or a manual setting value.

The present invention further provides a device for dynamically adjusting a sync-on-green (SOG) signal of a video signal, the device comprising: a clamp circuit for limiting a voltage swing range of a video signal so as to output a clamped signal; a triggering level circuit for determining a triggering level so as to output a triggering signal; a comparator for receiving the clamped signal and the triggering signal so as to output a compared signal; and a control unit coupled to the triggering level circuit and the comparator for receiving the compared signal so as to provide the triggering level circuit with a feedback control signal.

It is preferable that the device for dynamically adjusting a sync-on-green (SOG) signal of a video signal further comprises: a window comparator for receiving the clamped signal so as to provide an output level signal; and an analog-to-digital converter having a successive approximation register (SAR) for receiving the clamped signal so as to provide an output digital signal.

BRIEF DESCRIPTION OF THE DRAWINGS

The objects, spirits and advantages of the preferred embodiments of the present invention will be readily understood by the accompanying drawings and detailed descriptions, wherein.

DETAILED DESCRIPTION OF THE PREFERRED EMBODIMENT

The present invention providing a method and a device for dynamically adjusting a sync-on-green (SOG) signal of a video signal can be exemplified by the preferred embodiments as described hereinafter.

Figure 2:
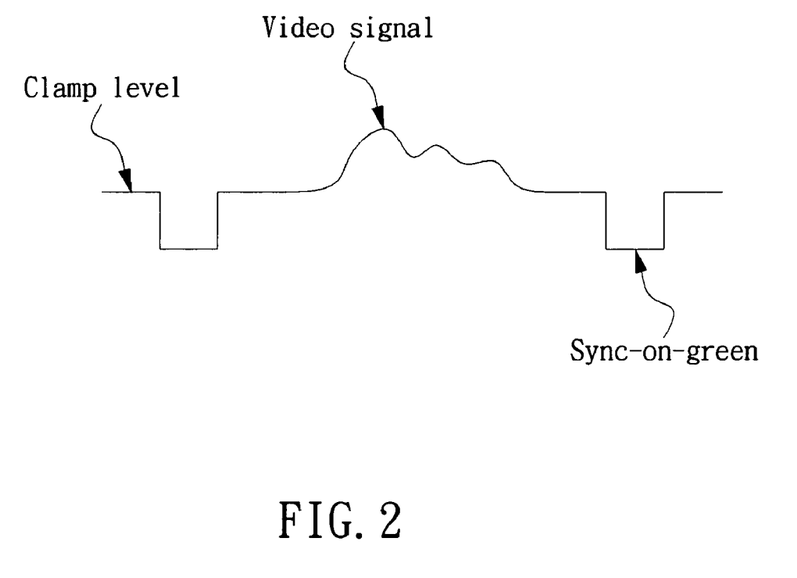
FIG. 2 is a schematic diagram showing a video signal comprising an SOG signal.
Figure 3:
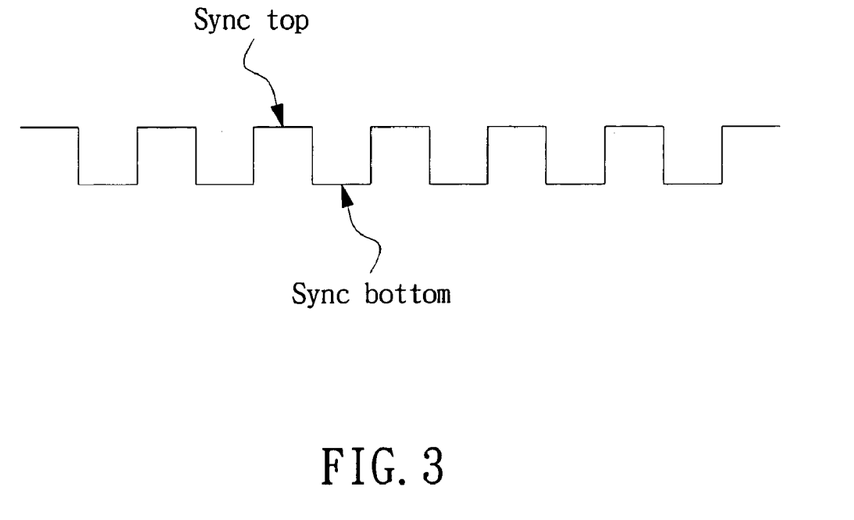
FIG. 3 is a schematic diagram showing an SOG signal extracted from a video signal.

Please refer to FIG. 2, which is a schematic diagram showing a video signal comprising an SOG signal. In FIG. 2, the analog video signal comprises an SOG signal, which is a clock signal. The clock signal drifts with the video signal when the video signal drifts. Furthermore, the difference value of the top voltage value and the bottom voltage value of the SOG signal may not stay constant due to noise or other sources of interference. The difference between the top voltage value and the bottom voltage value of the SOG signal is preferably 300 mV. In the present invention, an SOG signal is extracted from a video signal so as to dynamically adjust the SOG signal. The extracted SOG signal is shown as in FIG. 3.

Figure 4:
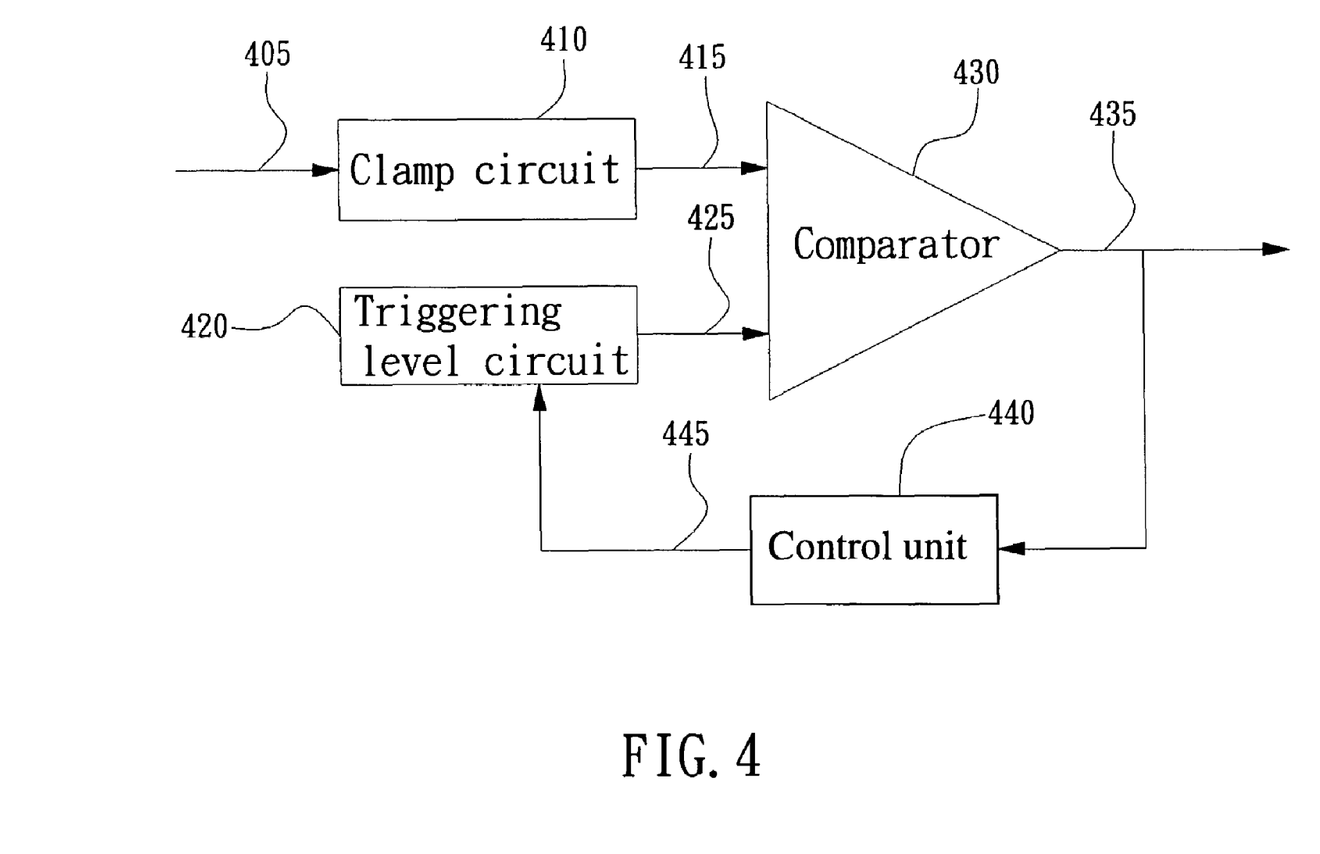
FIG. 4 is a schematic diagram showing a device for dynamically adjusting an SOG signal of a video signal in accordance with a first embodiment of the present invention.

Please refer to FIG. 4, which is a schematic diagram showing a device for dynamically adjusting an SOG signal of a video signal in accordance with a first embodiment of the present invention. The device comprises a clamp circuit 410, a triggering level circuit 420, a comparator 430 and a control unit 440. The clamp circuit 410 limits a voltage swing range of a video signal 405 so as to limit the video signal 405 within a clamp level and output a clamped signal 415. The triggering level circuit 420 determines a triggering level for the SOG signal so as to output a triggering signal 425. The comparator 430 compares the clamped signal 415 with the triggering signal 425 so as to output a compared signal 435. The control unit 440 receives the compared signal 435 and provides the triggering level circuit 420 with a feedback control signal 445 so as to adjust the triggering level of the SOG signal. Meanwhile, the compared signal 435 is an output SOG signal.

Figure 5:
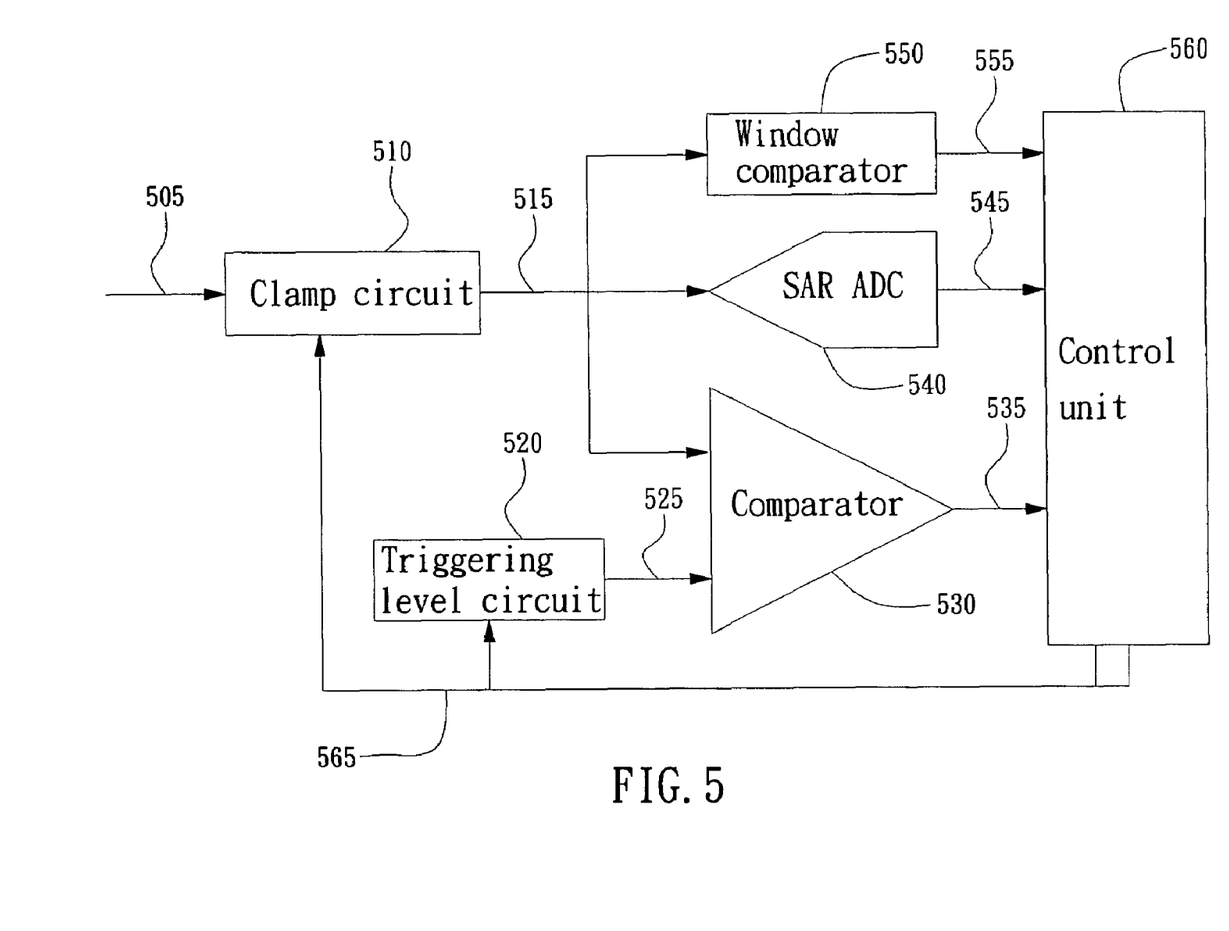
FIG. 5 is a schematic diagram showing a device for dynamically adjusting an SOG signal of a video signal in accordance with a second embodiment of the present invention.

Please further refer to FIG. 5, which is a schematic diagram showing a device for dynamically adjusting an SOG signal of a video signal in accordance with a second embodiment of the present invention. The device comprises a clamp circuit 510, a triggering level circuit 520, a comparator 530, a successive approximation register (SAR) analog-to-digital converter (ADC) 540, a window comparator 550 and a control unit 560. The clamp circuit 510 limits a voltage swing range of a video signal 505 so as to limit the video signal 505 within a clamp level and output a clamped signal 515. The triggering level circuit 520 determines a triggering level for the SOG signal so as to output a triggering signal 525. The comparator 530 receives the clamped signal 515 and the triggering signal 525 so as to output a compared signal 535. The SAR analog-to-digital converter 540 receives the clamped signal 515 so as to provide an output digital signal 545 through analog-to-digital conversion. For example, the ADC 540 detects the top voltage value and the bottom voltage value of the SOG signal and stores a control value into the SAR (not shown). Therefore, the ADC 540 is capable of locking the top voltage value and the bottom voltage value of the SOG signal by dynamic adjustment, so as to feedback control the triggering level circuit 520 and determine the triggering level for the SOG signal.

The window comparator 550 receives the clamped signal 515 so as to provide an output level signal 555. For example, the window comparator 550 continuously compares the clamped signal 515 with a plurality of levels so as to feedback control the clamp circuit 510. The control unit 560 receives the compared signal 535, the output digital signal 545 and the output level signal 555, and provides the clamp circuit 510 and the triggering level circuit 520 with a feedback control signal 565 so as to adjust the clamp level of the video signal as well as the triggering level of the SOG signal. The control unit 560 may perform a control operation on the compared signal 535, the output digital signal 545 and the output level signal 555. Meanwhile, the compared signal 535 is an output SOG signal, which is dynamically adjusted by the clamp level of the clamp circuit 510 and the triggering level of the triggering level circuit 520.

Figure 6:
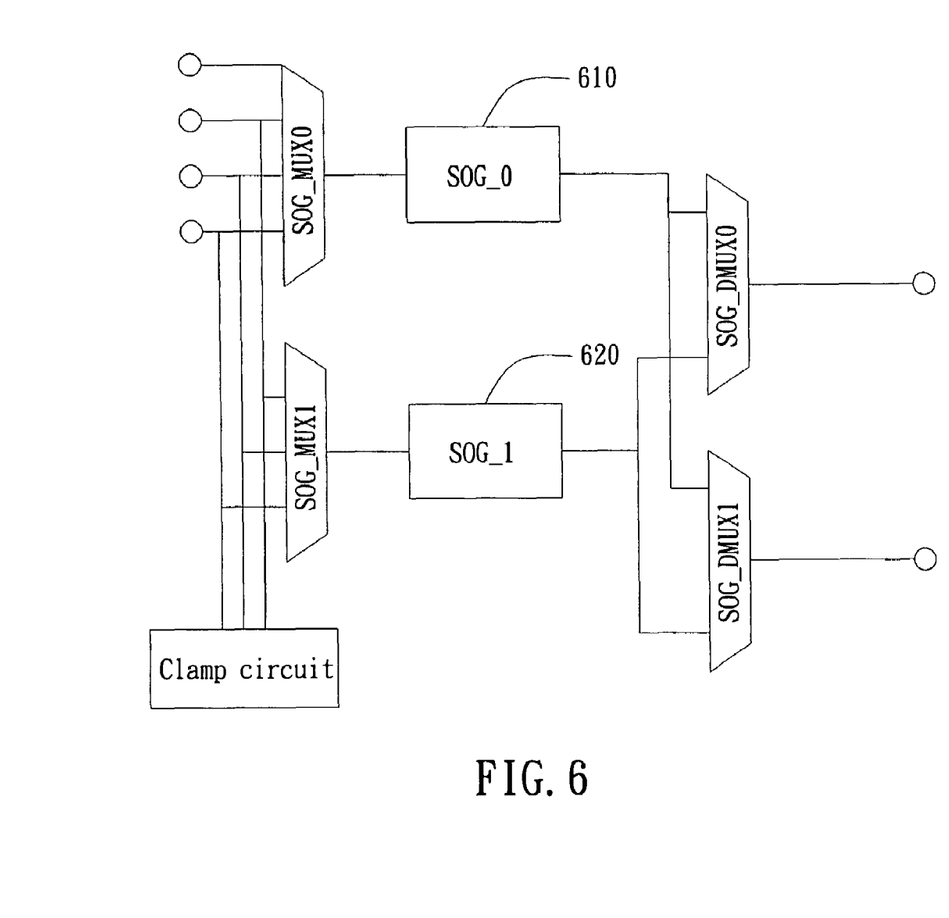
FIG. 6 is a schematic diagram showing a system comprising two devices for dynamically adjusting an SOG signal of a video signal of the present invention.

Please refer to FIG. 6, which is a schematic diagram showing a system comprising two devices for dynamically adjusting an SOG signal of a video signal of the present invention. For example, one of the two devices 610 and 620 operates in a fixed mode, while the other one, SOG_1 620, is capable of dynamically adjusting the SOG signal and is monitored. Alternatively, both the devices 610 and 620 can be individually implemented as the device for dynamically adjusting an SOG signal of a video signal of the present invention. In FIG. 6, the devices 610 and 620 are respectively coupled to multiplexers SOG_MUX0 and SOG_MUX1. The SOG devices 610 and 620 preferablly share the same clamp circuit. After the SOG signal is dynamically adjusted to become stable, the system applies the stable SOG signal through de-multiplexers SOG_DMUX0 and SOG_DMUX1 such that image jiggling during adjustment of the SOG signal is prevented.

Therefore, the present invention further discloses a composite device for dynamically adjusting an SOG signal of a video signal. In FIG. 6, the composite device comprises: a first multiplexer SOG_MUX0 for receiving a video signal; a second multiplexer SOG_MUX1 for receiving the video signal; a first adjusting device 610 for the SOG signal, coupled to the first multiplexer SOG_MUX0 so as to dynamically adjust a triggering level of the SOG signal of the video signal; a second adjusting device 620 for the SOG signal, coupled to the second multiplexer SOG_MUX1 so as to dynamically adjust the triggering level of the SOG signal of the video signal; a first de-multiplexer SOG_DMUX0, coupled to the first adjusting device 610 and the second adjusting device 620 so as to generate a first output SOG signal; and a second de-multiplexer SOG_DMUX1, coupled to the first adjusting device 610 and the second adjusting device 620 so as to generate a second output SOG signal. When the second output SOG signal is monitored to be stable, the first de-multiplexer SOG_DMUX0 and the second de-multiplexer SOG_DMUX1 operate to swap over the outputs from the first adjusting device 610 and the second adjusting device 620, respectively.

Figure 7:
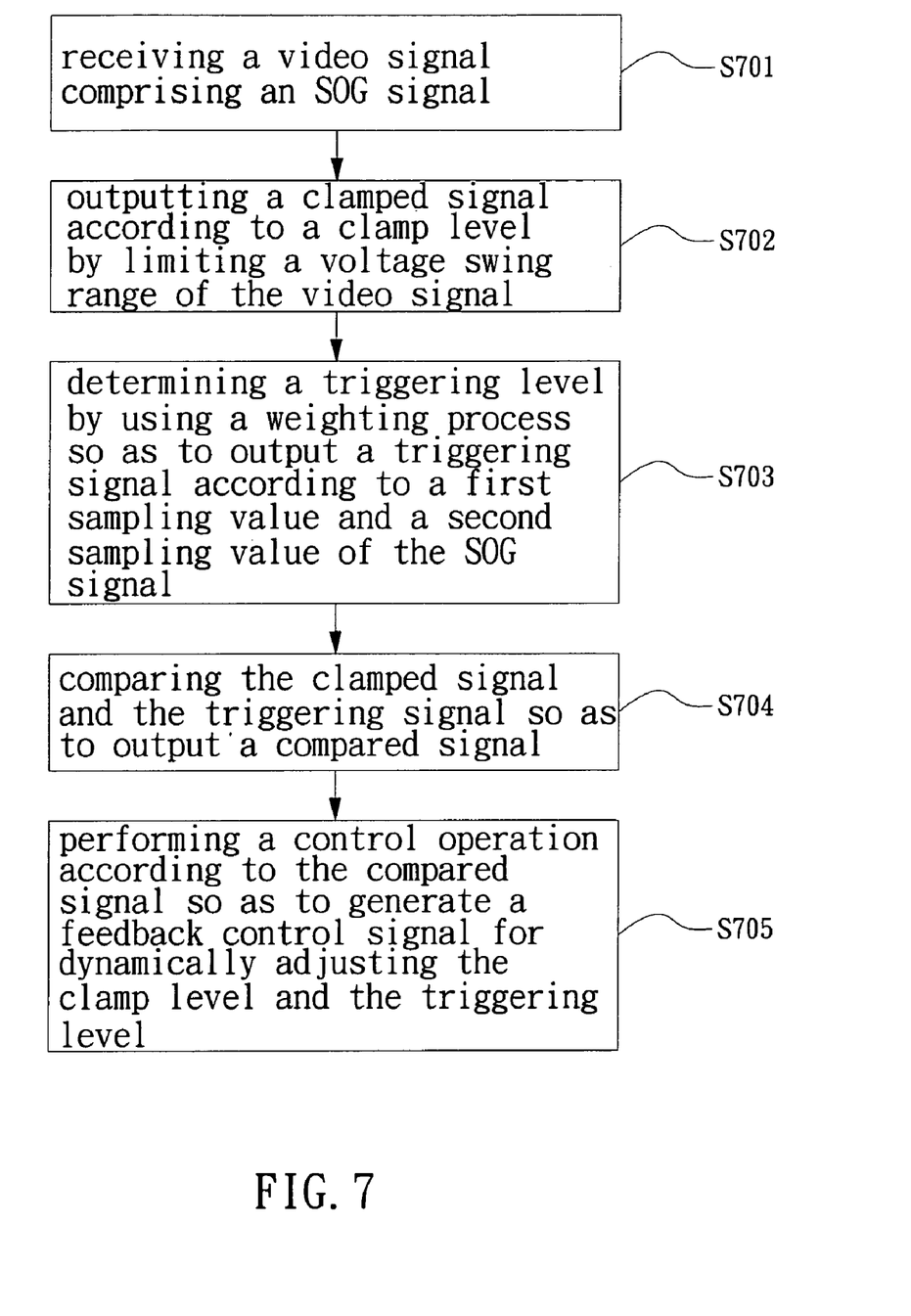
FIG. 7 is a flow chart showing a method for dynamically adjusting an SOG signal of a video signal in accordance with a first embodiment of the present invention.

FIG. 7 is a flow chart showing a method for dynamically adjusting an SOG signal of a video signal in accordance with a first embodiment of the present invention. In Step S701, a video signal comprising an SOG signal is received. A clamped signal is output according to a clamp level by limiting a voltage swing range of the video signal, wherein the clamp level is a default setting value, as described in Step S702. Further in Step S703, a triggering level is determined by using a weighting process so as to output a triggering signal according to a first sampling value and a second sampling value of the SOG signal. More particularly, the weighting process comprises steps of: providing a weighting value; and performing a weighting operation according to the first sampling value and the second sampling value so as to determine the triggering level. Preferably, the triggering level can be expressed in five ways as follows:

(1) triggering level=first sampling value+K*Delta;
(2) triggering level=second sampling value−K*Delta;
(3) triggering level=first sampling value±C;
(4) triggering level=second sampling value±C; and
(5) triggering level=C where the first sampling value is a bottom voltage value of the SOG signal, the second sampling value is a top voltage value of the SOG signal, the weighting value K is a default setting value, the weighting value C is a manual setting value and Delta is a difference value between the first sampling value and the second sampling value.

The method further proceeds with Step S704 wherein the clamped signal and the triggering signal are compared so as to output a compared signal and Step S705 wherein a control operation is performed according to the compared signal so as to generate a feedback control signal for dynamically adjusting the clamp level and the triggering level.

Figure 8:
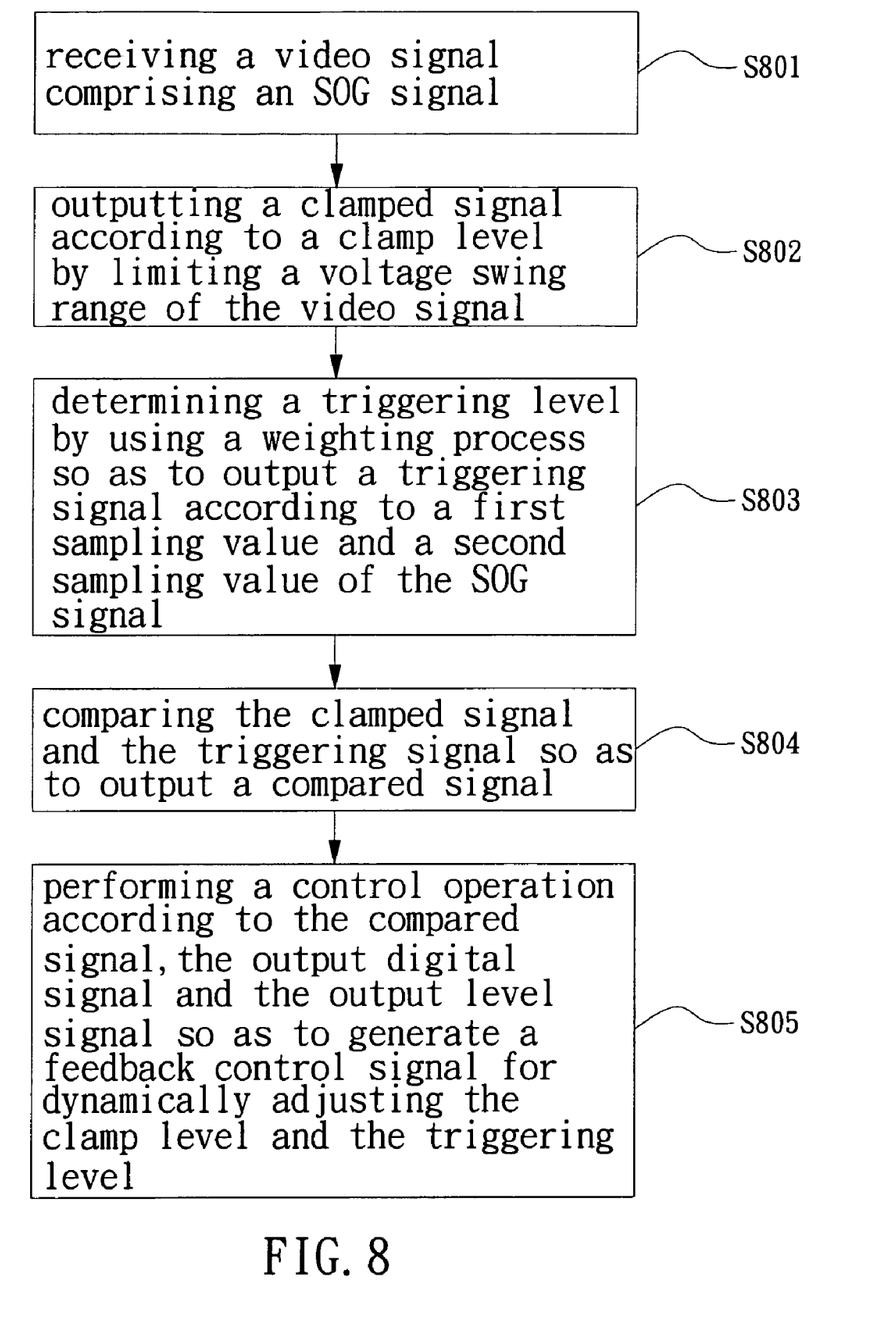
FIG. 8 is a flow chart showing a method for dynamically adjusting an SOG signal of a video signal in accordance with a second embodiment of the present invention.

FIG. 8 is a flow chart showing a method for dynamically adjusting an SOG signal of a video signal in accordance with a second embodiment of the present invention. Steps S801 to S804 in FIG. 8 are identical to Steps S701 to S704 in FIG. 7, and descriptions thereof are thus omitted. In Step S805, a control operation is performed according to the compared signal, an output level signal from a window comparator and an output digital signal from an ADC so as to generate a feedback control signal for dynamically adjusting the clamp level and the triggering level.

According to the above discussion, it is apparent that the present invention discloses a method and a device for dynamically adjusting a SOG signal of a video signal, capable of extracting an SOG signal from a video signal so as to dynamically adjust the SOG signal and thus overcome the foregoing problems. Therefore, the present invention is novel, useful and non-obvious.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A method for dynamically adjusting a sync-on-green (SOG) signal of a video signal, said method comprising steps of:
   receiving a video signal comprising an SOG signal;
   outputting a clamped signal by clamping said video signal according to a clamp level;
   determining a triggering level so as to output a triggering signal according to a first sampling value and a second sampling value of said SOG signal;
   comparing said clamped signal and said triggering signal so as to output a compared signal; and
   performing a control operation according to said compared signal so as to generate a feedback control signal for dynamically adjusting said clamp level and said triggering level.

2. The method as recited in claim 1, wherein said triggering level is determined by using a weighting process.

3. The method as recited in claim 2, wherein said first sampling value is a bottom voltage value of said SOG signal.

4. The method as recited in claim 3, wherein said second sampling value is a top voltage value of said SOG signal.

5. The method as recited in claim 4, wherein said triggering level is expressed as:
   said triggering level=said first sampling value+K*Delta;
   where K is a default setting value and Delta is a difference value between said first sampling value and said second sampling value.

6. The method as recited in claim 4, wherein said triggering level is expressed as:
   said triggering level=said second sampling value−K*Delta;
   where K is a default setting value and Delta is a difference value between said first sampling value and said second sampling value.

7. The method as recited in claim 4, wherein said triggering level is expressed as:
   said triggering level=said first sampling value±C;
   where C is a manual setting value.

8. The method as recited in claim 4, wherein said triggering level is expressed as:
   said triggering level=said second sampling value±C;
   where C is a manual setting value.

9. The method as recited in claim 4, wherein said triggering level is a manual setting value.

10. The method as recited in claim 2, wherein said weighting process comprises steps of:
    providing a weighting value; and
    performing a weighting operation according to said first sampling value and said second sampling value so as to determine said triggering level.

11. The method as recited in claim 10, wherein said weighting value is a default setting value.

12. The method as recited in claim 10, wherein said weighting value is a manual setting value.

13. A method for dynamically adjusting a sync-on-green (SOG) signal of a video signal, said method comprising steps of:
    receiving a video signal comprising an SOG signal;
    outputting a clamped signal by clamping said video signal according to a clamp level;
    determining a triggering level so as to output a triggering signal by using a weighting process according to a first sampling value and a second sampling value of said SOG signal;
    comparing said clamped signal and said triggering signal so as to output a compared signal;
    performing a control operation according to said compared signal and at least an input voltage signal; and
    generating a feedback control signal for dynamically adjusting said clamp level and said triggering level.

14. The method as recited in claim 13, wherein said input voltage signal is an output level signal from a window comparator.

15. The method as recited in claim 13, wherein said input voltage signal is an output digital signal from an analog-to-digital converter.

16. The method as recited in claim 13, wherein said weighting process comprises steps of:
    providing a weighting value; and
    performing a weighting operation according to said first sampling value and said second sampling value so as to determine said triggering level.

17. The method as recited in claim 16, wherein said weighting value is a default setting value.

18. The method as recited in claim 16, wherein said weighting value is a manual setting value.

19. A device for dynamically adjusting a sync-on-green (SOG) signal of a video signal, said device comprising:
    a clamp circuit for clamping a video signal so as to output a clamped signal;
    a triggering level circuit for determining a triggering level according to a first sampling value and a second sampling value of said SOG signal so as to output a triggering signal;
    a comparator for receiving said clamped signal and said triggering signal so as to output a compared signal; and
    a control unit coupled to said triggering level circuit and said comparator for receiving said compared signal so as to provide said triggering level circuit with a feedback control signal.

20. The device as recited in claim 19, further comprising:
    a window comparator for receiving said clamped signal so as to provide an output level signal.

21. The device as recited in claim 19, further comprising:
    an analog-to-digital converter for receiving said clamped signal so as to provide an output digital signal.

22. The device as recited in claim 19, wherein said control unit receives said compared signal and at least an input voltage signal and performs a control operation on said compared signal, said output digital signal and said output level signal.

23. The device as recited in claim 21, wherein said analog-to-digital converter comprises a successive approximation register.

* * * * *